(12) United States Patent
Crick et al.

(10) Patent No.: US 10,385,260 B2
(45) Date of Patent: Aug. 20, 2019

(54) FRACTURING FLUIDS INCLUDING AMINE OXIDES AS FLOWBACK AIDS

(71) Applicant: Ecolab USA Inc., Eagan, MN (US)

(72) Inventors: Youseffi Y. Crick, Houston, TX (US); Greg D. Sutton, Manvel, TX (US)

(73) Assignee: Ecolab USA Inc., St. Paul, MN (US)

( * ) Notice: Subject to any disclaimer, the term of this patent is extended or adjusted under 35 U.S.C. 154(b) by 344 days.

(21) Appl. No.: 13/739,172

(22) Filed: Jan. 11, 2013

(65) Prior Publication Data

US 2013/0180723 A1    Jul. 18, 2013

Related U.S. Application Data

(60) Provisional application No. 61/585,840, filed on Jan. 12, 2012.

(51) Int. Cl.
*C09K 8/68* (2006.01)
*E21B 43/26* (2006.01)
*C09K 8/60* (2006.01)

(52) U.S. Cl.
CPC ............. *C09K 8/68* (2013.01); *C09K 8/602* (2013.01); *E21B 43/26* (2013.01)

(58) Field of Classification Search
CPC ........ C09K 8/68; C09K 8/602; B01F 17/0028
USPC ...................... 166/308.2; 507/245
See application file for complete search history.

(56) References Cited

U.S. PATENT DOCUMENTS

| | | | |
|---|---|---|---|
| 4,938,893 A | 7/1990 | Copeland et al. | |
| 4,970,340 A * | 11/1990 | Smith ........................ | 564/298 |
| 5,214,041 A | 5/1993 | Ishino et al. | |
| 5,922,794 A * | 7/1999 | Prabhu et al. .............. | 524/236 |
| 6,719,053 B2 * | 4/2004 | Thompson ................ | 166/305.1 |
| 6,729,408 B2 | 5/2004 | Hinkel et al. | |
| 6,929,069 B2 | 8/2005 | Hinkel et al. | |
| 7,789,160 B2 | 9/2010 | Hough et al. | |
| 7,833,943 B2 | 11/2010 | Van Zanten et al. | |
| 7,932,214 B2 | 4/2011 | Zamora et al. | |
| 7,998,911 B1 | 8/2011 | Berger et al. | |
| 2003/0188870 A1 | 10/2003 | Hinkel et al. | |
| 2004/0209780 A1 * | 10/2004 | Harris et al. ................ | 507/117 |
| 2006/0258541 A1 * | 11/2006 | Crews .......................... | 507/203 |
| 2009/0118143 A1 * | 5/2009 | Hinkel et al. ................ | 507/200 |
| 2009/0281004 A1 * | 11/2009 | Ali et al. ...................... | 507/219 |
| 2009/0305913 A1 * | 12/2009 | Welton et al. ............... | 507/204 |
| 2011/0136704 A1 * | 6/2011 | Sharma et al. .............. | 507/205 |

FOREIGN PATENT DOCUMENTS

| | | |
|---|---|---|
| CN | 101775276 A | 7/2010 |
| EP | 0 267 662 A2 | 5/1988 |

OTHER PUBLICATIONS

Papavinasam, Uhlig's Corrosion Handbook—Chapter 59, 2nd Edition (2000) p. 1101.*
International Search Report dated May 19, 2014 for related PCT application PCT/US2014/010564. (10 Pages).
International Search Report issued for PCT/US2014/010564, dated May 19, 2014, 3 pages.
Smith, K. R., et al., "Comparing Didecylmethylamine Oxide With Stearyldimethylamine Oxide," Journal of the Society of Cosmetic Chemists, Jan./Feb. 1987, pp. 43-55, vol. 38.
Extended European Search Report dated Aug. 23, 2016 relating to European Patent Application No. 14737985.3, 10 pages.

* cited by examiner

*Primary Examiner* — Angela M DiTrani Leff
*Assistant Examiner* — Avi T Skaist
(74) *Attorney, Agent, or Firm* — Stinson LLP

(57) ABSTRACT

An aqueous fracturing fluid comprises an environmentally friendly flowback aid. The flowback aid includes an amine oxide having the formula $(CH_3)NO(R_1)(R_2)$, where $R_1$ and $R_2$ are independently selected from linear or branched alkyl groups having from 8 to 16 carbon atoms. Optionally, the fracturing fluid may further comprise an alcohol ethoxylate of the formula $R_3-(OC_2H_4)_x-OH$, wherein $R_3$ is a linear or branched alkyl group having from 6 to 18 carbon atoms, and wherein x ranges from 3 to 25. One example of an amine oxide is didecylmethyl amine oxide, and one example of an alcohol ethoxylate is ethoxylated isodecylalcohol (also known as ethoxylated isodecanol). The fracturing fluid is introduced through a well bore into the subterranean formation and pressurized to fracture the subterranean formation. The fracturing fluid is then allowed to flow back into the well bore from the subterranean formation.

17 Claims, No Drawings

FRACTURING FLUIDS INCLUDING AMINE OXIDES AS FLOWBACK AIDS

CROSS-REFERENCE TO RELATED APPLICATIONS

This application claims priority of U.S. provisional patent application Ser. No. 61/585,840, filed on Jan. 12, 2012.

BACKGROUND

Field of the Invention

The invention relates generally to fracturing fluids that contain a flowback aid, and methods of fracturing a subterranean formation using fracturing fluids that contain a flowback aid.

Background of the Related Art

Hydraulic fracturing is a process that forms fractures in a subterranean formation using a pressurized fluid. The fracturing fluid is introduced into the subterranean formation through a wellbore that has been drilled into the formation, and then pressurized to fracture the formation. Among other components, the fracturing fluid will typically contain a proppant material that enters into the newly formed fractures and prevents those fractures from closing up.

At the end of a hydraulic fracturing job, a large surface-area fracture will have been created and propped permanently open by the application of a proppant-laden, pressurized, often aqueous, hydraulic fluid. The next step in the hydraulic fracturing job is to decrease the pressure applied to the aqueous hydraulic fluid to allow the fluid sitting in the near well-bore region of the target formation between the targeted hydrocarbons and the wellbore to flow back into the well and up to the surface for treatment and disposal or re-use later.

The amount of fracturing fluid left behind in the formation will diminish to an irreducible fraction and then stop flowing back. This irreducible fraction of fracturing fluid left behind in the formation will subsequently impede the flow of hydrocarbon from the petroliferous formation into the very high permeability proppant pack.

A flowback aid may be included in the fracturing fluid to reduce capillary pressure and water blocks, thereby improving the kinetics of the flowback and preventing or minimizing the leaving-behind of any substantial amount of the fracturing fluid. Flowback aids, such as surfactants, have also been shown to aid in the "clean-up" of the proppant pack, thereby accelerating the flow of hydrocarbons through the high permeability proppant pack, as well. Known flowback aids each have their own set of properties and may present a tradeoff of one beneficial property for another undesirable property. Determining the best flowback aid for a specific reservoir may involve multiple considerations.

Experience has demonstrated that a scientific measure of the ability of a flowback aid to change the wettability of the near wellbore formation or to reduce the water saturation in the pores of the targeted subterranean petroliferous formation can be obtained by accurately measuring the contact angle formed by the flowback aid within a capillary tube. In flowback tests on cores simulating the performance of an element of the reservoir under simulated in-situ conditions, experience has shown that capillary contact angles greater than 80° are correlated with the more efficient flowback of aqueous fluids (simulating those used in formation fracturing). Reducing the water saturation in the pores of the targeted subterranean petroliferous formation is desirable for increased production of oil or gas because the volume of the flow channel for oil or gas through the pores in the rock will be occupied, in part, by the immiscible water phase; and reducing the fraction of this volume that is occupied by water will necessarily increase the fraction of this volume that is available for flow by oil or gas.

BRIEF SUMMARY

One embodiment of the present invention provides an aqueous fracturing fluid, comprising an amine oxide of the formula $(CH_3)NO(R_1)(R_2)$, where $R_1$ and $R_2$ are independently selected from linear or branched alkyl groups having from 8 to 16 carbon atoms. Another embodiment of the present invention provides an additive to a fracturing fluid, wherein the additive comprises an amine oxide of the formula $(CH_3)NO(R_1)(R_2)$, where $R_1$ and $R_2$ are independently selected from linear or branched alkyl groups having from 8 to 16 carbon atoms.

Another embodiment of the present invention provides a method of fracturing a subterranean formation. The method comprises introducing a fracturing fluid through a well bore into the subterranean formation, wherein the fracturing fluid comprises an amine oxide of the formula $(CH_3)NO(R_1)(R_2)$, where $R_1$ and $R_2$ are independently selected from linear or branched alkyl groups having from 8 to 16 carbon atoms, pressurizing the fracturing fluid to fracture the subterranean formation, and allowing the fracturing fluid to flow back into the well bore from the subterranean formation.

DETAILED DESCRIPTION

One embodiment of the present invention provides an aqueous fracturing fluid, comprising an amine oxide of the formula $(CH_3)NO(R_1)(R_2)$, where $R_1$ and $R_2$ are independently selected from linear or branched alkyl groups having from 8 to 16 carbon atoms. Another embodiment of the present invention provides an additive to a fracturing fluid, wherein the additive comprises an amine oxide of the formula $(CH_3)NO(R_1)(R_2)$, where $R_1$ and $R_2$ are independently selected from linear or branched alkyl groups having from 8 to 16 carbon atoms. A particularly preferred amine oxide is didecylmethyl amine oxide. Didecylmethyl amine oxide is an amine oxide of the formula $(CH_3)NO(R_1)(R_2)$, in which $R_1$ is decyl- and $R_2$ is also decyl-. Other preferred amine oxides include those of the formula $(CH_3)NO(R_1)(R_2)$, in which $R_1$ and $R_2$ are independently selected from linear or branched alkyl groups having from 8 to 12 carbon atoms. Specific examples of other particularly preferred amine oxides include those of the formula $(CH_3)NO(R_1)(R_2)$, in which $R_1$ is octyl- and $R_2$ is dodecyl-, those in which $R_1$ is nonyl- and $R_2$ is undecyl-, those in which $R_1$ is octyl- and $R_2$ is dimethyldecyl-, those in which $R_1$ is nonyl- and $R_2$ is methyldecyl-, those in which $R_1$ is dimethylhexyl- and $R_2$ is dodecyl-, those in which $R_1$ is methylheptyl- and $R_2$ is dodecyl-, those in which $R_1$ is dimethylhexyl- and $R_2$ is dimethyldecyl-, those in which $R_1$ is methylheptyl- and $R_2$ is methyldecyl-, and mixtures of these with didecylmethyl amine oxide.

The concentration of the amine oxide in the aqueous fracturing fluid may vary according to the requirements of a particular fracturing job. Preferably, the amine oxide is present in a concentration that is effective to improve the flowback of the fracturing fluid. In one embodiment, the amine oxide is present within the fracturing fluid in a concentration between 0.00005 and 2.5 percent by weight. A more preferred amine oxide is with the concentration between 0.001 and 2.5 percent by weight; a yet more preferred amine oxide is with the concentration between 0.1 and 2.5 percent by weight; and an even yet more preferred amine oxide concentration is between 0.2 and 2.0 percent by weight of the fracturing fluid.

In one embodiment of the invention, the aqueous fracturing fluid further includes a non-ionic co-surfactant such as an alcohol ethoxylate of the formula $R_3—(OC_2H_4)_x—OH$, wherein $R_3$ is a linear or branched alkyl group having from 6 to 18 carbon atoms, and wherein x ranges from 3 to 25. One preferred alcohol ethoxylate is ethoxylated isodecylalcohol (also known as ethoxylated isodecanol). A more preferred range for x is from 6 to 18. A yet more preferred range for x is from 7 to 11.

The concentration of alcohol ethoxylate in the fracturing fluid may vary according to the requirements of a particular fracturing job. Preferably, the alcohol ethoxylate is present in a concentration that is effective to improve the flowback of the fracturing fluid. In one embodiment, the alcohol ethoxylate is present in the fracturing fluid in a concentration between 5 and 15 percent by weight, preferably between 8 and 15 percent by weight and yet more preferably between 8 and 12 percent by weight of the fracturing fluid. Most preferably, it is the combination of alcohol ethoxylated and amine oxide that should be most effective to improve the flowback of the fracturing fluid. In an alternative, the combination of alcohol ethoxylated and amine oxide should be effective to cause the fracturing fluid to have a contact angle of greater than or equal to 80 degrees, and a surface tension less than about 24 mN/m.

The aqueous fracturing fluid may include additional components that are known to those skilled in the art. For example, the aqueous fracturing fluid may include a proppant. Furthermore, the aqueous fracturing fluid may include one or more additive selected from an acid, a friction reducing agent, a viscosifying agent, a viscosifying agent activator or crosslinker, a biocide, a clay stabilizer, an anti-foaming agent, a pH adjuster, a corrosion inhibitor, a fluid-loss additive, an iron control agent, a scale inhibitor or scale control agent, a chelating agent, a viscosifying-agent breaker, and combinations thereof.

Another embodiment of the present invention provides a method of fracturing a subterranean formation. The method comprises introducing a fracturing fluid through a well bore into the subterranean formation, wherein the fracturing fluid comprises an amine oxide of the formula $(CH_3)NO(R_1)(R_2)$, where $R_1$ and $R_2$ are independently selected from linear or branched alkyl groups having from 8 to 16 carbon atoms, pressurizing the fracturing fluid to fracture the subterranean formation, and allowing the fracturing fluid to flow back into the well bore from the subterranean formation. It should be recognized that further embodiments of the method may include, for example, the use of a fracturing fluid in accordance with any of the fracturing fluid embodiments described herein.

EXAMPLES

Example 1—Biodegradation Testing

Three flowback aid formulations were prepared for comparative testing using the Organisation for Economic Co-operation and Development (OECD, French: OCDE) method 301B. OECD 301B is a standard method for evaluating the biodegradation of a given chemical over time in an environment that simulates the break-down of that chemical in the real-world environment. If substances, such as polychlorinated biphenyls and Styrofoam cups degrade in the environment too slowly, they can exert a damaging effect on the environment simply by excessive accumulation, termed "bioaccumulation". Such substances are not considered to be "environmentally friendly" as a result of their low rate of biodegradation. Based on the results obtained from the OECD 301B protocol, tabulated in Table 1, it can be judged that Formulation C is the least degraded during the 28-day test and is therefore least "environmentally friendly" by this measure, while Formulation G performs preferably in the environment compared with Formulation C, and Formulation A performs yet more preferably in the environment compared with Formulations C and G.

TABLE 1

Biodegradation Testing

| ID | Sample/blend in water | Biodegradation % (28 days) |
|---|---|---|
| A | 12% alcohol ethoxylate (only) | 100 |
| C | 12% alcohol ethoxylate + 0.7% dimethyl dicoco quaternary ammonium chloride | 60 |
| G | 12% alcohol ethoxylate + 1.5% didecylmethyl amine oxide | 78 |

Example 2—Contact Angle Testing

A number of flowback aid formulations were prepared for comparative testing. Some of the formulations contained a single flowback aid and other formulations contained a blend of flowback aids. Table 2, below, identifies ten different formulations A-J. The composition and concentration of each flowback aid(s) is identified in the second column. The identified flowback aid(s) in each formulation were added to water. For example, Formulation G contained 12% alcohol ethoxylate (ethoxylated isodecylalcohol, available as Serdox NDL 9.8 from Elementis Specialties, Inc., Hightstown, N.J.), 1.5% amine oxide (didecylmethyl amine oxide), and 86.5% water. The quaternary ammonium compound ("Quat") used in Formulations C and D was a dimethyl dicoco quaternary ammonium chloride, where the coco group is either a saturated or unsaturated alkyl having from 12 to 16 carbon atoms (available as Corsaquat 2C-75 from CorsiTech of Houston, Tex.). Formulation J uses a decyldimethyl amine oxide (a "single tail" amine oxide) for comparison with the didecylmethyl amine oxide (a "double tail" amine oxide) used in Formulations E to I.

Prior to testing, each of the identified formulations was further diluted with water to make a 0.2 weight percent (wt %) solution (containing 0.2 wt % of the formulation described in column 2 of Table 2). For example, a 0.2 wt % solution could be prepared by combining 0.2 grams of a flowback aid formulation of Table 2 with 99.8 g of water. It is the 0.2 wt % solution that is used in the contact angle measurements of Table 2 and the surface tension measurements of Table 3. All percentages mentioned in Tables 1, 2, and 3 are weight percentages.

Contact angles were measured using capillary tubes. The method that was used to measure contact angles included measuring the relative contact angle of deionized (DI) water on a glass surface that has been treated (coated) with a surfactant solution. Specifically, the method included: (a) touching the surface of the 0.2% surfactant solution with a capillary tube and allowing the solution to rise into the capillary tube so that the solution will coat the walls of the tube for a few seconds, (b) draining the capillary tube by patting the capillary tube on a paper towel or slowly blowing dry nitrogen through the tube, and (c) touching the capillary tube to the surface of the DI water and recording any rise of the DI water into the capillary tube by measuring the height of the DI water in the capillary tube.

The formula used to calculate the surface tension in the capillary tube is:

$$T = rhdg/2 \cos(angle)$$

where T is surface tension in a capillary tube (mN/m (milliNewton per meter)), r is the radius of the internal opening of the capillary tube (in m), h is the height that the DI water is raised to within the tube (in m), d is the density of the DI water (in $kg/m^3$), g is gravity (9.8 $m/s^2$) and angle is the contact angle of the DI water against the sides of tube. The specification for contact angle is greater than or equal to 80 degrees.

TABLE 2

Contact Angle Measurements of a 0.2 wt % Solution of Various Flowback Aid Formulations

| ID | Sample/blend in Water | Test | Height (cm) | Contact angle | Average Contact Angle |
|----|-----------------------|------|-------------|---------------|-----------------------|
| A  | 12% alcohol ethoxylate (only) | 1 | 1.6940 | 66.10 | 65.68 |
|    |                       | 2 | 1.7130 | 65.82 |       |
|    |                       | 3 | 1.7600 | 65.11 |       |
| B  | 1.5% didecylmethyl amine oxide (only) | 1 | 0.3830 | 84.74 | 84.52 |
|    |                       | 2 | 0.4010 | 84.50 |       |
|    |                       | 3 | 0.4140 | 84.32 |       |
| C  | 12% alcohol ethoxylate + 0.7% dimethyl dicoco quaternary ammonium chloride | 1 | 0.0500 | 89.31 | 89.29 |
|    |                       | 2 | 0.0390 | 89.46 |       |
|    |                       | 3 | 0.0660 | 89.09 |       |
| D  | 12% alcohol ethoxylate + 1.5% dimethyl dicoco quaternary ammonium chloride | 1 | 0.0650 | 89.11 | 89.31 |
|    |                       | 2 | 0.0460 | 89.37 |       |
|    |                       | 3 | 0.0410 | 89.44 |       |
| E  | 12% alcohol ethoxylate + 0.5% didecylmethyl amine oxide | 1 | 0.9550 | 76.80 | 77.34 |
|    |                       | 2 | 0.9050 | 77.50 |       |
|    |                       | 3 | 0.8890 | 77.73 |       |
| F  | 12% alcohol ethoxylate + 1.0% didecylmethyl amine oxide | 1 | 1.4380 | 69.89 | 70.15 |
|    |                       | 2 | 1.4420 | 69.83 |       |
|    |                       | 3 | 1.3800 | 70.73 |       |
| G  | 12% alcohol ethoxylate + 1.5% didecylmethyl amine oxide | 1 | 0.5110 | 82.98 | 82.25 |
|    |                       | 2 | 0.5530 | 82.40 |       |
|    |                       | 3 | 0.6270 | 81.38 |       |
| H  | 12% alcohol ethoxylate + 2.0% didecylmethyl amine oxide | 1 | 0.4910 | 83.26 | 83.62 |
|    |                       | 2 | 0.4040 | 84.45 |       |
|    |                       | 3 | 0.4990 | 83.14 |       |
| I  | 12% alcohol ethoxylate + 2.5% didecylmethyl amine oxide | 1 | 0.4460 | 83.88 | 83.79 |
|    |                       | 2 | 0.4520 | 83.79 |       |
|    |                       | 3 | 0.4590 | 83.70 |       |
| J  | 12% alcohol ethoxylate + 1.5% decyldimethyl amine oxide | 1 | —      | 50.81 | 51.68 |
|    |                       | 2 | —      | 55.20 |       |
|    |                       | 3 | —      | 49.03 |       |

According to the contact angle measurements in Table 2, Formulations A, E, F and J had an average contact angle less than 80 degrees and did not meet the specification. It would appear that all of the formulations except A, E, F, and J are somewhat acceptable; but formulations B, C, D, H, and I are more acceptable.

Formulation A establishes the performance of one relatively inexpensive and environmentally acceptable surfactant, an ethoxylated alcohol, at an average contact angle of 65.68°. However, to achieve "acceptable" performance in flowback (as specified by those fracturing a subterranean formation), a flowback aid must exhibit a contact angle of at least 80° to obtain the necessary level of changing the wettability of the near wellbore formation or reducing the water saturation in the pores of the targeted subterranean petroliferous formation.

Formulation B shows the performance of the amine oxide by itself.

Formulations C and D blend in a little quaternary amine with the alcohol ethoxylate. While the 89+ degree contact angles are acceptable, the quaternary amine is not nearly so environmentally acceptable as either the ethoxylated alcohol or the amine oxide.

Formulations E through I include 12 wt % alcohol ethoxylate with varying concentrations of the amine oxide (0.5%, 1.0%, 1.5%, 2.0% and 2.5%, respectively). Formulations G, H and I produced contact angles greater than 80 degrees. So, the data shows that good performance can be achieved by blending the amine oxide, either at 1.5%, 2.0%, or 2.5%, into the relatively inexpensive ethoxylated alcohol. The resulting blend provides good performance in excess of the specification, while being environmentally friendly.

Formulation J is a blend of 12 wt % alcohol ethoxylate and 1.5 wt % decyl dimethyl amine oxide in water. Accordingly, Formulation J is similar to Formulation G, with the only difference being that the "double tail" amine oxide (didecylmethyl amine oxide) of Formulation G has been replaced with the "single tail" amine oxide (decyldimethyl amine oxide) in Formulation J. The contact angle test showed that the average contact angle for Formulation G was 82.25 degrees, compared to the average contact angle for Formulation J of 51.68 degrees. This comparison shows that under otherwise identical conditions and concentrations, a double tail amine oxide yields surprisingly greater performance that a single tail amine oxide of similar composition.

Example 3—Surface Tension Testing

The flowback aid Formulations A to J of Example 2 were also used in this Example 3, and surface tension measurements were made using 0.2 wt % solutions prepared in the same manner as described in Example 2. The methodology used to measure the surface tension data presented below in Table 3 is a variant of the ASTM Method D1331-89, entitled "Standard Test Methods for Surface and Interfacial Tension". The method used follows the methodology of D1331-89, except that a plate was used instead of a ring. The specification for surface tension is less than about 24 mN/m.

TABLE 3

Surface Tension Measurements of a 0.2 wt % Solution of Various Flowback Aid Formulations

| ID | Sample/blend in Water | Test | Surface Tension (mN/m) | Average Surface Tension (mN/m) |
|----|-----------------------|------|------------------------|--------------------------------|
| A  | 12% alcohol ethoxylate (only) | 1 | 31.4510 | 31.11 |
|    |                       | 2    | 31.0264 |       |
|    |                       | 3    | 30.8663 |       |
| B  | 1.5% didecylmethyl amine oxide (only) | 1 | 24.5719 | 24.45 |
|    |                       | 2    | 24.4323 |       |
|    |                       | 3    | 24.3497 |       |
| C  | 12% alcohol ethoxylate + 0.7% dimethyl dicoco quaternary ammonium chloride | 1 | 31.0429 | 30.72 |
|    |                       | 2    | 30.5915 |       |
|    |                       | 3    | 30.5321 |       |
| D  | 12% alcohol ethoxylate + 1.5% dimethyl dicoco quaternary ammonium chloride | 1 | 31.0834 | 30.90 |
|    |                       | 2    | 30.7662 |       |
|    |                       | 3    | 30.8585 |       |

TABLE 3-continued

Surface Tension Measurements of a 0.2 wt % Solution of Various Flowback Aid Formulations

| ID | Sample/blend in Water | Test | Surface Tension (mN/m) | Average Surface Tension (mN/m) |
|----|----|----|----|----|
| E | 12% alcohol ethoxylate + 0.5% didecylmethyl amine oxide | 1 2 3 | 24.1436 23.9846 24.0581 | 24.06 |
| F | 12% alcohol ethoxylate + 1.0% didecylmethyl amine oxide | 1 2 3 | 24.3449 24.2732 23.8321 | 24.15 |
| G | 12% alcohol ethoxylate + 1.5% didecylmethyl amine oxide | 1 2 3 | 24.2382 23.8628 24.0771 | 24.06 |
| H | 12% alcohol ethoxylate + 2.0% didecylmethyl amine oxide | 1 2 3 | 24.1561 24.1885 23.7242 | 24.02 |
| I | 12% alcohol ethoxylate + 2.5% didecylmethyl amine oxide | 1 2 3 | 24.1144 23.9877 23.6842 | 23.93 |
| J | 12% alcohol ethoxylate + 1.5% decyldimethyl amine oxide | 1 2 3 | 39.73 40.50 39.98 | 40.07 |

In comparing the results tabulated in Table 3 with the specification that the surface tension measurement be less than about 24 mN/m, it would appear that all of the formulations except A, C, D, and J are somewhat acceptable; but formulations E, F, G, H, and I are more acceptable; and formulation I is most acceptable. According to the contact angle measurements in Table 2, and the surface tension measurements in Table 3, it would appear that all of the formulations except and A, C, D, E, F, and J are somewhat acceptable; but formulations B, G, H, and I are more acceptable. By combining the performance evaluations with both the contact angle measurements (Table 2) and the surface tension measurements (Table 3), it would appear that formulations G, H, and I are yet more acceptable.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of fracturing a subterranean formation, comprising:
    introducing a fracturing fluid through a well bore into the subterranean formation, wherein the fracturing fluid comprises an amine oxide of the formula $(CH_3)NO(R_1)(R_2)$, where $R_1$ and $R_2$ are independently selected from linear or branched alkyl groups having from 8 to 16 carbon atoms;
    pressurizing the fracturing fluid to fracture the subterranean formation; and
    allowing the fracturing fluid to flow back into the well bore from the subterranean formation,
    wherein the concentration of the amine oxide in the fracturing fluid is between 0.00005 and 2.5 percent by weight.

2. The method of claim 1, wherein the amine oxide is didecylmethyl amine oxide.

3. The method of claim 1, wherein the fracturing fluid further comprises an alcohol ethoxylate of the formula $R_3$—$(OC_2H_4)_x$—OH, wherein $R_3$ is a linear or branched alkyl group having from 6 to 18 carbon atoms, and wherein x ranges from 3 to 25.

4. The method of claim 3, wherein the concentration of the alcohol ethoxylate in the fracturing fluid is between 0.0005 and 15 percent by weight.

5. The method of claim 3, wherein the alcohol ethoxylate is ethoxylated isodecylalcohol.

6. The method of claim 1, wherein the fracturing fluid further comprises a proppant.

7. The method of claim 1, wherein the fracturing fluid further comprises an additive selected from a corrosion inhibitor, fluid-loss additive, and combinations thereof.

8. The method of claim 1, wherein $R_1$ and $R_2$ are independently selected from linear or branched alkyl groups having from 8 to 12 carbon atoms.

9. The method of claim 1, wherein the amine oxide includes combinations of $R_1$ and $R_2$ selected from: $R_1$ is octyl- and $R_2$ is dodecyl-; $R_1$ is nonyl- and $R_2$ is undecyl-; $R_1$ is octyl- and $R_2$ is dimethyldecyl-; $R_1$ is nonyl- and $R_2$ is methyldecyl-; $R_1$ is dimethylhexyl- and $R_2$ is dodecyl-; $R_1$ is methylheptyl- and $R_2$ is dodecyl-; $R_1$ is dimethylhexyl- and $R_2$ is dimethyldecyl-; and $R_1$ is methylheptyl- and $R_2$ is methyldecyl-.

10. The method of claim 1, further comprising a non-ionic co-surfactant.

11. The method of claim 3, wherein x ranges from 7 to 11.

12. The method of claim 1, wherein the concentration of the amine oxide in the fracturing fluid is between 1.0 and 2.5 percent by weight.

13. The method of claim 12, wherein the amine oxide comprises didecylmethyl amine oxide.

14. The method of claim 13, further comprising an alcohol ethoxylate, wherein the alcohol ethoxylate comprises ethoxylated isodecylalcohol.

15. The method of claim 14, wherein the concentration of the ethoxylated isodecylalcohol is between 8 and 15 percent by weight.

16. The method of claim 14, wherein the concentration of the didecylmethyl amine oxide in the fracturing fluid is between 1.5 and 2.5 percent by weight and the concentration of the ethoxylated isodecylalcohol in the fracturing fluid is between 8 and 12 percent by weight.

17. The method of claim 16, wherein the fracturing fluid has a contact angle of greater than or equal to 80 degrees.

\* \* \* \* \*